March 22, 1949.  J. W. NOYES  2,464,884
SLED SHELTER
Filed March 14, 1946  2 Sheets-Sheet 1
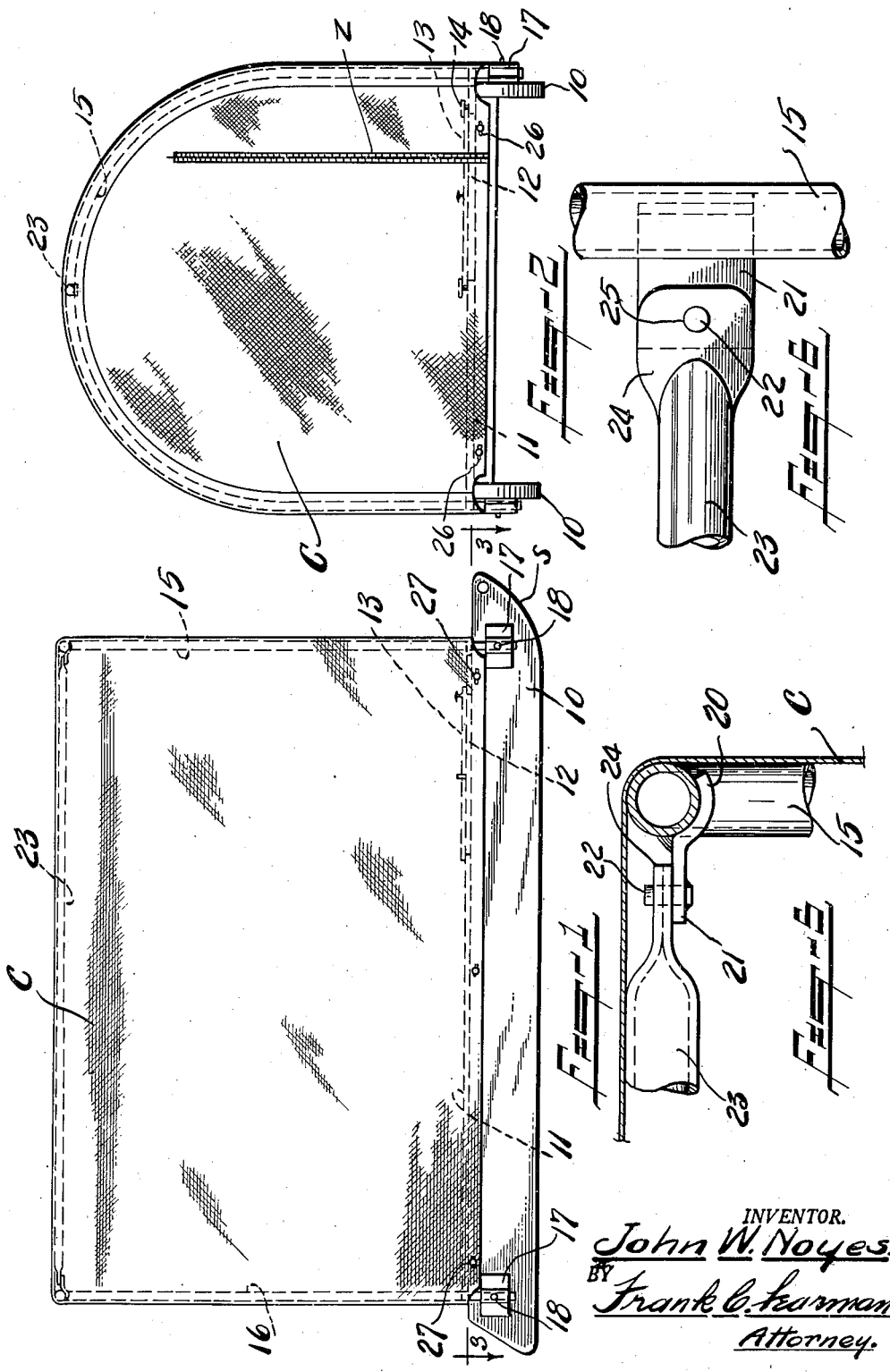
INVENTOR.
John W. Noyes.
BY Frank C. Fearman.
Attorney.

March 22, 1949.  J. W. NOYES  2,464,884
SLED SHELTER
Filed March 14, 1946  2 Sheets-Sheet 2
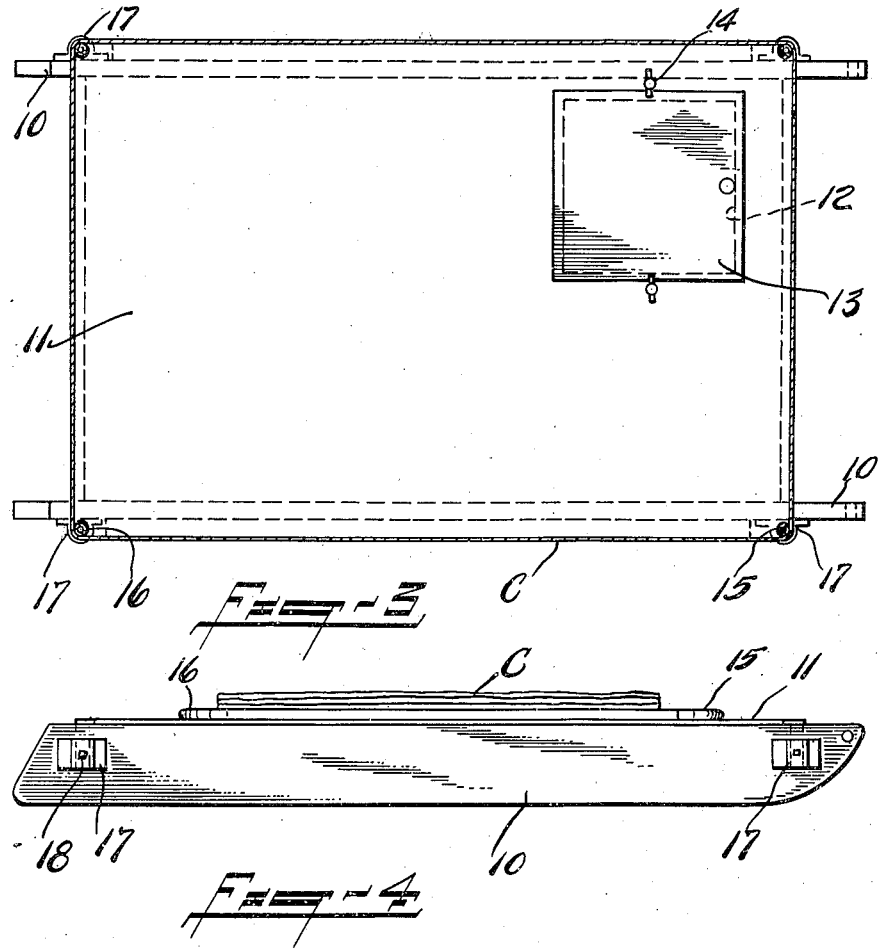
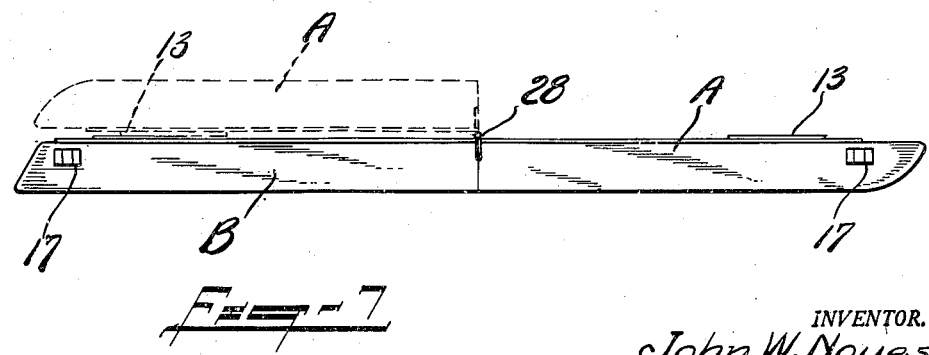
INVENTOR.
John W. Noyes
BY Frank C. Leaman
Attorney.

Patented Mar. 22, 1949

2,464,884

UNITED STATES PATENT OFFICE 2,464,884

SLED SHELTER

John W. Noyes, Bay City, Mich.

Application March 14, 1946, Serial No. 654,437

1 Claim. (Cl. 296—104)

This invention relates to shelters and more specifically to a collapsible shelter designed for use by fishermen and sportsmen in general to protect them against cold and weather when fishing through a hole in the ice, or when standing or sitting in places exposed to the elements.

One of the prime objects of the invention is to design a lightweight, collapsible shelter which can be easily and quickly erected, assembled and/or disassembled, and which can be compactly folded into a relatively small bundle so that it can be carried in the trunk of an automobile, or in other places of limited carrying capacity.

Another object is to provide a sled shelter that can be readily drawn over the ice and/or snow, so that it can be readily moved from car to location, or from one location to another.

A further object is to provide a sled shelter having a readily collapsible frame which can be erected in but a few minutes time, which supports the occupant above the ice and which is provided with a trap door and opening through which the fishing is carried on.

Still a further object is to design a neat-appearing shelter which can be readily and economically manufactured and assembled, and which is provided with zipper means to facilitate the occupant's entering or leaving the shelter.

With the above and other objects in view, the present invention consists in the combination and arrangement of parts, hereinafter more fully described, illustrated in the accompanying drawings, and more particularly pointed out in the appended claim, it being understood that changes may be made in the form, size, proportion, and minor details of construction, without departing from the spirit, or sacrificing any of the advantages of the invention.

In the drawings:

Fig. 1 is a side-elevational view of my shelter erected and ready for occupancy.

Fig. 2 is an end-elevational view.

Fig. 3 is a sectional, plan view taken on the line 3—3 of Fig. 1.

Fig. 4 is a side-elevational view showing the collapsible frame, etc., in collapsed folded position.

Fig. 5 is an enlarged, fragmentary, side-elevational view illustrating the ridge pole connection to one of the end frames.

Fig. 6 is a top, plan view of the connection shown in Fig. 5.

Fig. 7 illustrates an alternate construction in which the sled is formed in two sections, the broken lines showing one section swung over the other to facilitate the storage and/or carrying thereof.

Referring now to the drawings. The letter "S" indicates a conventional sled preferably of a size to fit into the trunk of an automobile, this includes runners 10 connected by a floor 11 having an opening 12 therein which is positioned over a hole in the ice (not shown), and a trap door 13 forms a closure for said opening and is held in position by any suitable securing means 14 as showns.

The shelter proper comprises a collapsible frame covered by fabric or the like, said frame comprising spaced-apart bowed end frames 15 and 16, the ends of which are inserted in sockets 17 secured to the side walls of the sled runners in any approved manner, setscrews 18 being provided on the sockets for securing the end frames in set position.

Clip members 20 are welded or otherwise secured to the upper bowed sections of the frame members 15 and 16, the horizontally projecting section 21 of each clip being formed with an upstanding pin 22, and to which a ridge pole 23 is detachably connected.

Both the end frames and the ridge pole can be formed of lightweight tubing, the ends of the ridge pole being flatted as shown at 24, and an opening 25 is provided in said flatted section, the pins 22 being inserted in said opening, thus accurately spacing the end frames and the upper edge of the ridge pole being flush with the upper edge of end frames to form a smooth frame structure over which the flexible covering C can be readily placed.

The flexible canvas cover C is fitted over the frame and eyelets 26 are provided in the lower edge thereof, buttons 27 being provided on the edge of the sled for detachable engagement with said eyelets.

A conventional zipper Z is provided in the one end wall of the canvas covering, thus forming a door through which the occupant can leave and enter the shelter, and a camp stool, (not shown), can be placed in the shelter so that the occupant can sit in comfort protected from the elements and cold while fishing through the trap door in the sled, and the front and rear ends of the sled can be packed with snow to further shut out winds and drafts.

In Fig. 7 of the drawings, I have shown a slightly modified construction in which the sled is divided intermediate its length to form sections A and B connected together by means of hinges 28 so that either section can be swung up and over the companion section for compact storage and/or transportation, and as clearly shown in broken lines in this figure. The sled can be of sufficient length to accommodate two occupants, and a trap door can be provided in each section.

From the foregoing description, it will be clearly obvious that I have perfected a very simple, practical, and comfortable sled shelter that can be compactly folded and carried in an automobile, and which can be easily and quickly set up for occupancy when desired.

What I claim is:

A foldable sled shelter comprising spaced-apart, bowed tubular end frames adapted to be detachably secured to a sled frame, clip members welded to the lower face of the upper bowed section of each end frame and formed with a horizontally extending section disposed substantially on a horizontal center line through the tubular members, an upwardly projecting pin on the upper face of each horizontally extending section, a horizontally disposed, tubular ridge pole spanning the end frames and formed with flatted end sections having pin-receiving openings therein for detachably accommodating said pins, and a flexible cover over said end frames and ridge pole and secured to the sled frame to form a complete closure.

JOHN W. NOYES.

REFERENCES CITED

The following references are of record in the file of this patent:

UNITED STATES PATENTS

| Number | Name | Date |
| --- | --- | --- |
| 450,158 | James | Apr. 14, 1891 |
| 1,061,547 | Kennedy et al. | May 13, 1913 |
| 1,270,782 | Carr et al. | July 2, 1918 |
| 1,490,491 | Smothers | Apr. 15, 1924 |
| 1,760,144 | Kaner | May 27, 1930 |

FOREIGN PATENTS

| Number | Country | Date |
| --- | --- | --- |
| 182,831 | Switzerland | May 16, 1936 |
| 192,624 | Great Britain | Feb. 8, 1923 |